United States Patent [19]
Lance

[11] Patent Number: 5,097,991
[45] Date of Patent: Mar. 24, 1992

[54] METERING DISPENSER FOR LIQUIDS

[75] Inventor: Mark A. Lance, Pascoe Vale, Australia

[73] Assignee: ITW New Zealand Limited, Auckland, New Zealand

[21] Appl. No.: 561,670

[22] Filed: Aug. 2, 1990

[51] Int. Cl.⁵ .............................................. G01F 11/00
[52] U.S. Cl. .................................. 222/442; 222/453; 222/504
[58] Field of Search ............... 222/442, 449, 451, 453, 222/504, 518

[56] References Cited

U.S. PATENT DOCUMENTS

| | | |
|---|---|---|
| 3,072,302 | 1/1963 | Giovannoni et al. ............... 222/442 |
| 3,199,747 | 8/1965 | Erickson ............................ 222/453 |
| 3,811,601 | 5/1974 | Reighard et al. ............... 222/504 X |
| 3,848,775 | 11/1974 | Possell ............................ 222/504 X |
| 3,913,807 | 10/1975 | Lale et al. ............................ 222/442 |
| 4,011,969 | 3/1977 | Martin ............................ 222/504 X |
| 4,015,755 | 4/1977 | Lerner et al. ....................... 222/442 |
| 4,240,570 | 12/1980 | Brown et al. ....................... 222/442 |
| 4,607,766 | 8/1986 | Jones ............................ 222/453 X |
| 4,629,099 | 12/1986 | Jones ............................... 222/453 |
| 4,892,236 | 1/1990 | Griffiths et al. ............... 222/442 X |

FOREIGN PATENT DOCUMENTS

| | | | |
|---|---|---|---|
| 1025432 | 3/1958 | Fed. Rep. of Germany ...... 222/453 |
| 3511507 | 10/1986 | Fed. Rep. of Germany ...... 222/453 |
| 3628417 | 2/1988 | Fed. Rep. of Germany ...... 222/453 |
| 1410366 | 8/1965 | France ............................... 222/453 |
| 6700364 | 3/1967 | Netherlands ....................... 222/453 |
| 558156 | 6/1977 | U.S.S.R. ............................ 222/453 |
| 499115 | 1/1939 | United Kingdom ............... 222/453 |
| 686328 | 1/1953 | United Kingdom ............... 222/442 |
| 792752 | 4/1958 | United Kingdom ............... 222/442 |
| 1296270 | 11/1972 | United Kingdom ............... 222/442 |
| 1577908 | 10/1980 | United Kingdom ............... 222/453 |

*Primary Examiner*—Michael S. Huppert
*Assistant Examiner*—Anthoula Pomrening
*Attorney, Agent, or Firm*—Young & Thompson

[57] ABSTRACT

A metering dispenser for spirits or other potable liquids has an upper portion for reception of an inverted bottle, with an inlet passage leading to a valved metering chamber. A spool valve is positioned in the metering chamber and has a rod extending therefrom having a core of magnetized stainless steel to serve as the valve actuator controlled by a surrounding solenoid coil which is electrically energized to operate the dispenser. At least one channel is provided on or in the rod to allow the dispensed liquid to flow along the rod.

11 Claims, 4 Drawing Sheets

METERING DISPENSER FOR LIQUIDS

BACKGROUND OF THE INVENTION

This invention relates to a metering dispenser for liquids and other flowable materials such as powders, granules and the like. The invention is particularly, but not exclusively, adapted for use with a gravity feeding upstream appliance such as in spirit dispensers as used in hotels, bars and other establishments, for dispensing a measured quantity of liquid from an upturned bottle. It will be convenient to hereinafter describe the invention with reference to that application.

Spirit dispensers of the foregoing kind are well known and available in various forms. This invention is concerned with that form having a valve assembly which is movable between load and dispense positions. In the load position, the valve assembly is arranged so that liquid or other flowable material can flow from an attached and upturned bottle to fill a metering chamber of the dispenser. In a dispense position, the valve assembly shuts off communication between said bottle and metering chamber, and opens an outlet port through which the contents of the metering chamber are dispensed.

The valve assembly of such dispensers is usually mechanically or electrically operated, according to preference. Electro-mechanical dispensers, in particular, are generally of a complex construction, and in many cases have a large number of moving parts. The complexity of such devices naturally adds to their cost, and in addition increases the probability of malfunction. They also need a complicated cleaning system. Because the electronic package is permanently linked to the liquid/valve system, cleaning involves putting a bottle filled with a warm detergent solution onto the dispenser and cycling it until empty. The process must then be repeated with a bottle of fresh water to remove the detergent residue.

This has to be done on a periodic basis or when one liquor is to be substituted for another.

SUMMARY OF INVENTION

An object of the invention is to go some way toward providing a metering dispenser for liquids and flowable materials which is of relatively simple construction, has the minimum of moving parts and which is effective and reliable in operation.

Another object of the present invention in the preferred form, is to provide an improved metering dispenser, which is usable, for example, as a spirit dispenser of the foregoing kind.

Yet another object of this invention in its preferred form is to provide a relatively simple and effective metering dispenser having an electrically operated valve assembly. Still yet another object is to go at least part way toward providing a novel and improved metering dispenser, or to at least provide the public with a useful choice.

Accordingly, in a first broad aspect of this invention there is provided a metering dispenser for liquids and other flowable materials comprising an elongate inlet passage having an entry thereto and exit therefrom coupled to a main body incorporating an elongate discharge passage having an entry thereto and an exit therefrom, a metering chamber with an inlet port thereto coupled to the exit of said inlet passage and an outlet port therefrom coupled to the entry of said discharge passage, valve actuator means to operate a valve assembly disposed within the outlet passage, said valve assembly disposed and movable within the body between two positions, these being a first and load position at which said valve assembly acts to open said inlet passage to the metering chamber whilst the discharge passage therefrom is closed, and second and dispense position at which said valve assembly acts to close said inlet passage from the metering chamber whilst the discharge passage therefrom is opened to thus control the flow of materials through said inlet and outlet ports, and into and out of said metering chamber, and further includes an expansion chamber that incorporates venting means adapted to allow communication of the inlet passage to the atmosphere when the valve assembly is in the said first and load position.

Preferably the expansion chamber is disposed above the metering chamber, and wherein said venting means comprises one or more ports between said metering chamber and said expansion chamber capable of being closed by said valve assembly when in the second and dispense position.

Preferably the valve actuator means is slidingly fitted within said discharge passage and is coupled to the valve assembly on a common axis such that said valve assembly can be moved correspondingly with the actuation means along that axis.

Preferably the valve actuator means comprises a core incorporating at least one channel to facilitate the flow of materials there past, and is associated with a solenoid coil provided circumjacent said discharge passage such that with energization of said coil the core can be induced to move the valve assembly coupled thereto.

Preferably, the valve assembly comprises means adapted to sealingly abut said one or other of said inlet port to or outlet port from the metering chamber as said assembly is moved within said body, and means adapted to close the exit end of the discharge passage, when said valve assembly is in the said first and load position and further acting to open said exit end of the discharge passage when the valve assembly is at the said second and dispense position.

According to a second broad aspect of this invention there is provided a metering dispenser for liquids and other flowable materials comprising an elongate inlet passage having an entry thereto and exit therefrom coupled to a main body incorporating an elongate discharge passage having an entry thereto and an exit therefrom, a metering chamber with an inlet port thereto coupled to the exit of said inlet passage and an outlet port therefrom coupled to the entry of said discharge passage, valve actuator means to operate a valve assembly disposed within the outlet passage, said valve assembly disposed and movable within the body and adapted to control the flow of materials through said inlet and outlet ports, and into and out of said metering chamber and wherein the inlet passage is provided within a cap separable from the main body, said cap incorporating a biased valve adapted to close the entry to the inlet passage upon separation of the cap from the body.

It will be convenient to hereinafter describe the invention by reference to a particular form of spirit dispenser as shown in the accompanying drawings. It will be appreciated however, that embodiment is not the only type of metering dispenser to which the invention is applicable, and that the invention may be adopted in a different form to those shown by the drawings.

DESCRIPTION OF THE PREFERRED EMBODIMENTS

Figure 1:
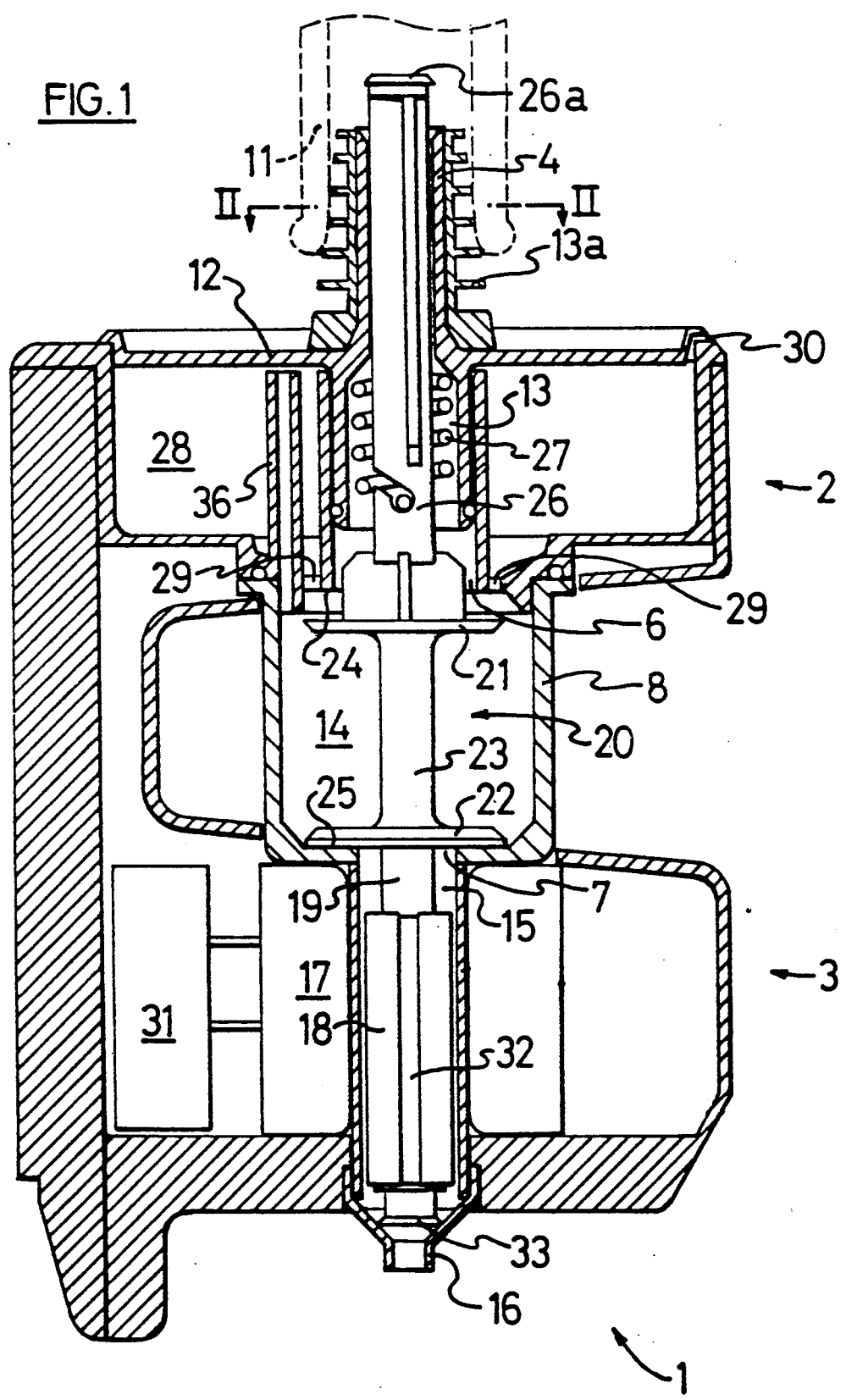
FIG. 1 illustrates a cross-sectional schematic view showing a particular spirit dispenser according to one embodiment of the invention, in which the valve assembly is in a load position.

As can be seen from the above described example constructional drawings, the present invention provides for a metering dispenser 10 adapted to dispense a measured quantity of flowable material or liquid (such as alcoholic spirits and other beverages) from an upstream appliance, such as upturned bottle 11 in substantially consistent amounts.

The dispenser 10 shown in the drawings includes a main body 1 which is adapted to be mounted in a fixed position on an appropriate support (not shown). The body 1 has upper and lower parts 2 and 3 respectively, between which is located a metering chamber 14. The upper part 2 forms an expansion chamber 28 which will hereinafter be described in greater detail, and a lower part 3 contains actuator means for a valve assembly 20. In the particular embodiment illustrated, the actuator means is of an electrical nature, and whilst that is the preferred arrangement alternative actuator means may be substituted therefor.

Means are provided whereby an upstream appliance, such as an upturned bottle 11 can be connected to the dispenser 10 in such a way that the interior of said bottle 11 is able to communicate with the interior of the metering chamber 14. Such means may include an upstanding plug 13a, adapted to be insertable into an appropriately sized open neck of a bottle 11. The plug 13a may be removable from the dispenser 12 to permit replacement by another plug which may be more suitable for use with another form or size of bottle.

In the particular arrangement shown, the plug 13a is connected to an upstanding tubular section 4 of a cap 12 to define an elongate inlet passage 13 forming the communication path between the interior of the bottle 11 and the metering chamber 14.

An orifice at the lower or exit end of the passage 13 forms an inlet port 6 to the metering chamber 14, and is surrounded by a surface 24 which acts as a valve seat in a manner hereinafter described. It will be appreciated however that alternative arrangements are clearly possible.

It is preferred that an outlet port 7 of the metering chamber 14 is formed in a lower side wall thereof in substantial alignment with the inlet port 6. An upper or entry end of a discharge passage 15 communicates with the outlet port 7, and a lower or exit end of that passage 15 communicates with a downstream discharge nozzle 16. In the preferred arrangement shown, the ports 6 and 7, and the inlet and discharge passages 13 and 15 are all in substantial axial alignment. Whilst this is not essential, it has the advantage of contributing to the compact nature and relative simplicity of the dispenser 10 shown. Preferably a part of a side wall 8 of the metering chamber 14 may be formed from substantially transparent material to enable the contents of that chamber 14 to be observed, although in practice, it may be more convenient to simply mould the entire metering chamber 14 from transparent plastics or glass material.

An appropriate valve 20 assembly is used to control the movement of liquid or other flowable material into and out of the chamber 14. The particular valve assembly 20 illustrated includes a stem 23 having closure plates 21 and 22 at respective opposite ends thereof. An upper plate 21 is adapted to sealingly abut against the surface 24 and thereby close the inlet port 6 when in, what will be referred to as, the dispense position, whilst a lower plate 22 is adapted to sealingly abut against a surface 25 which surrounds outlet port 7 and thereby close that port 7 when in, what will be referred to as, the load position.

The valve assembly 20 moves substantially axially between two extreme positions at which, respectively, one of the ports 6 or 7 is open whilst the other of the ports 7 or 6 is closed. In the load position, the inlet port 6 is open, whilst the outlet port 7 is closed. In the dispense position the inlet port 6 is closed whilst the outlet port 7 is open. It will be apparent that other valve assemblies might be adopted and that valve seating surfaces other than the illustrated flat surfaces 24 and 25 may be utilized.

Actuator means for the valve assembly 20 may be of a mechanical, electrical or other suitable nature. Electrically operable actuator means are shown in the example construction, and that means preferably comprises a core 18 associated with a circumjacently disposed solenoid coil 17.

In the embodiment illustrated, the coil 17 is located in a lower part 3 of the body 1 and surrounds the discharge passage 15. The core 18 is located within the passage 15 and is arranged for substantially axial movement relative thereto. A rod 19 connects the core 18 and valve assembly 20 so that said valve assembly 20 moves axially in response to the axial movement of the core 18.

Biasing means as hereinafter described is operative to urge the valve assembly 20 and core 18 to a lower and load position (as illustrated in FIG. 1). Energization of the coil 17 operates to cause the core 18 and valve assembly 20 to move upward against the action of the biasing means to a raised and dispense position.

It is generally preferred for the core 18 to be a sliding fit within the discharge passage 15 so that the distance between the core 18 and circumjacent coil 17 is as close as practically possible. Consequently, means need be provided to promote flow of liquid or other flowable material to be meterably discharged over or through the core 18. In the arrangement illustrated, such means comprise one or more longitudinal grooves 32 formed in the outer surface of the core 18. It will be appreciated however that elongate longitudinal apertures or helically cut grooves may be alternatively utilized.

It is preferred that the core 18 have a corrosion resistant periphery. Use has been made of magnetized stainless steel in this regard, and even though stainless steel can only be relatively weakly magnetised as compared with purely ferrite materials, it has nonetheless been found suitable in the present application. Materials used as alternatives to stainless steel may include ceramic magnetic material or (electroplated) iron or steel.

A valve member 33 may be connected to a lower end of the core 18 as shown, and operable to minimise and prevent egression of liquid or other flowable material into the discharge nozzle 16 whilst the valve assembly 20 is in the load position. It is preferred that the valve member 33 is of a flexible nature so as not to impede the closing of the outlet port 7.

Any appropriate electric or electronic control means 31 may be used to control energization of the coil. Such control means 31 may include a printed circuit board of suitable design and a timer or other control means eg. optical sensor (31a and 31b) to control the period of energization of the coil 17.

If desired, the time may be adjustable to enable sensitive variation of the energization period.

Figure 2:
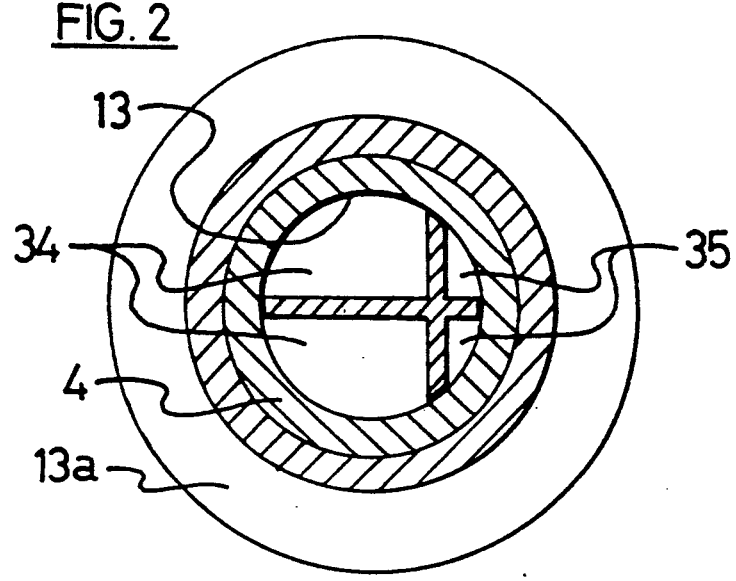
FIG. 2 shows an enlarged cross-sectional view taken along line II—II of FIG. 1.

In the particular construction illustrated, the aforementioned biasing means comprise a coil compression spring 27 which acts on a rod 26 so as to push that rod 26 downwardly. As shown in FIG. 1, the rod 26 engages or is connected to an upper end of the valve assembly 20 so that the downward bias and movement of the rod 26 causes a corresponding downward bias and movement of the valve assembly 20 and core 18. The rod 26 is slideably mounted within the bore 5 and may be in a cruciform shape when viewed in traverse cross-section (as illustrated in FIG. 2), so as to provide both liquid and air passages 34 and 35. Other arrangements may be adopted, to facilitate upward movement of air into the upturned bottle 11, as liquid from said bottle 11 is moving downwardly through the bore 5 and the inlet passage 13.

The dispenser 10 may be provided with means whereby it can be separated from the bottle 11 whilst leaving the bottle 11 in an upturned disposition. In the example arrangement as shown, that means includes the cap 12, which is removable from the main body 1 of the dispenser 10, and a valve member 26a provided at an upper end of the rod 26. When the cap 12 and body 1 of the dispenser 10 are separated from one another, the valve member 26a is operable to move downwardly under the influence of the spring 27 and engage the upper end of the tubular section 4, and in so doing, preventing the passage of liquid into the bore 5 and hence undesirable leakage of the contents of the bottle 11. In normal operating circumstances, such downward movement is prevented because of the engagement of plate 22 with surface 25.

Any form of separable connection may be provided between the cap 12 and main body 1 of the dispenser 10. In the example construction shown, that connection means includes a friction fit between complementary and cooperable parts of the two members, but other arrangements are possible.

It is preferred to provide the dispenser 10 with an expansion chamber 28 which communicates with the metering chamber 14 so as to enable relief of the metering chamber 14 in the event that the contents of that chamber 14 and or bottle 11 expand because of changing temperature conditions. Such relief has the advantage of minimizing the possible of leakage caused by build-up of pressure within the metering chamber 14.

Figure 3:
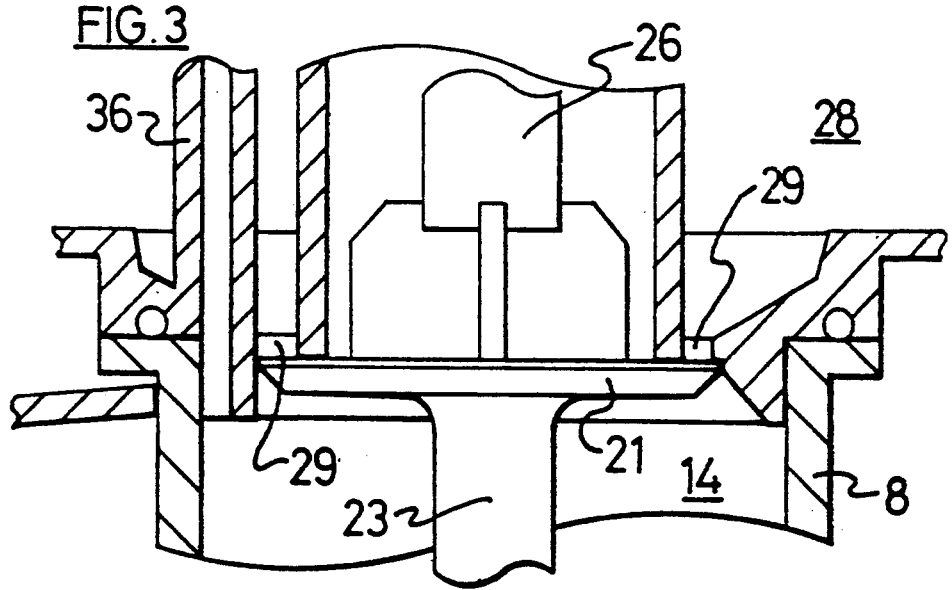
FIG. 3 illustrates an enlarged view of part of the construction shown in FIG. 1, but showing an upper part of the valve assembly in a dispense position.
Figure 4:
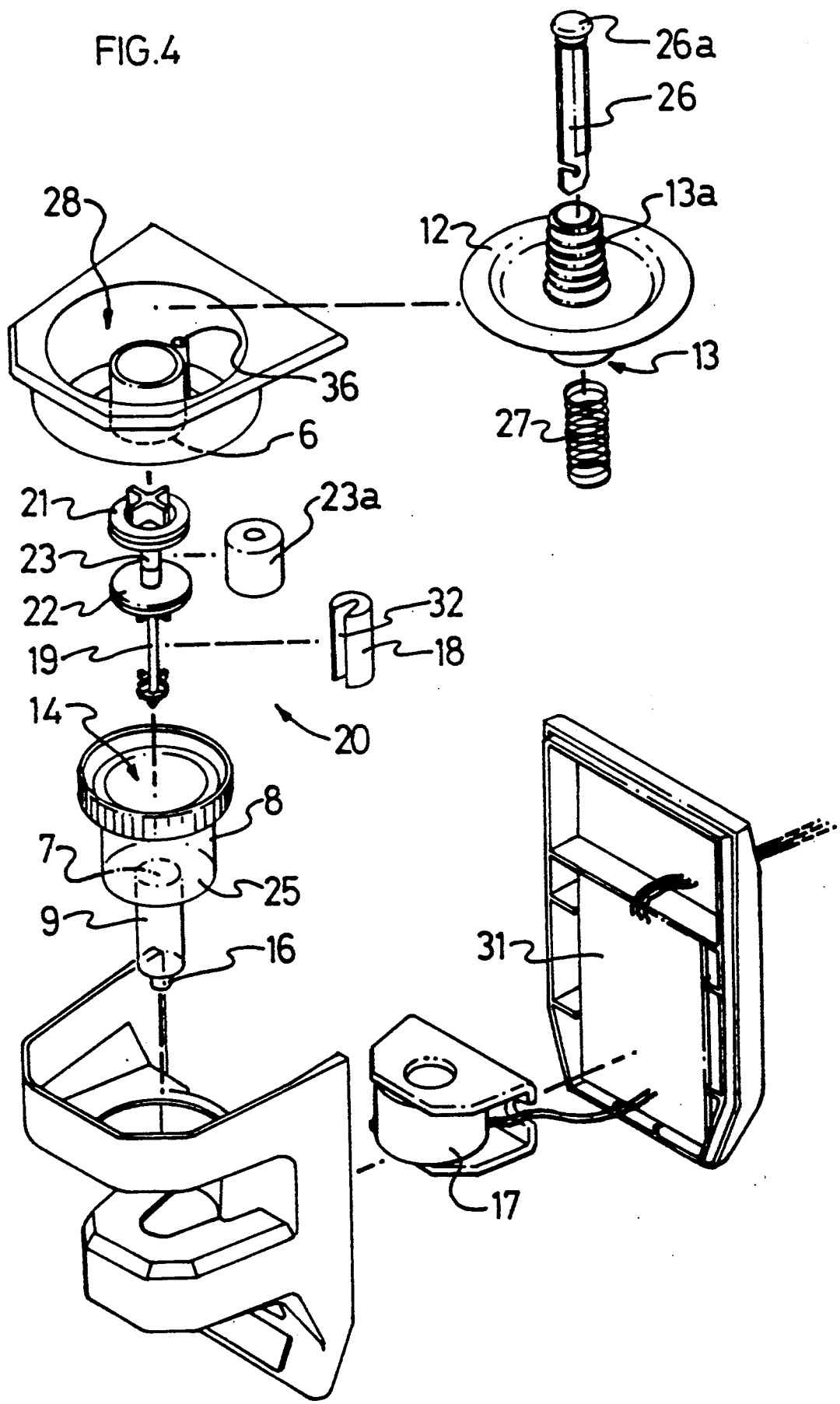
FIG. 4 illustrates the components of the preferred form of the invention in an exploded perspective view.
Figure 5:
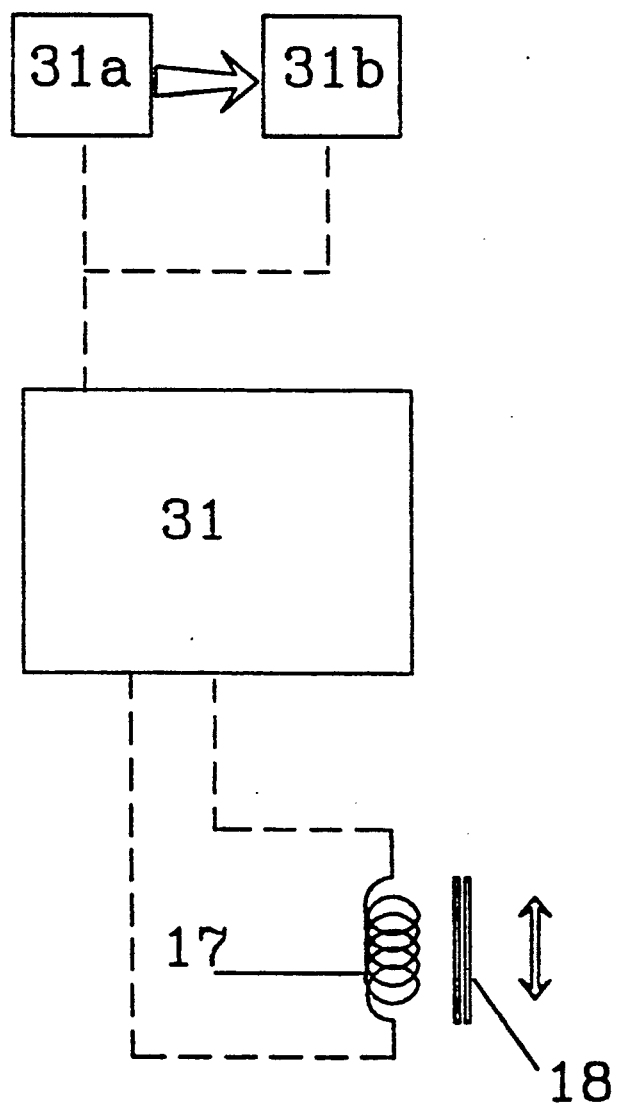
FIG. 5 illustrates a block diagram for solenoid control.

In the particular construction illustrated, said expansion chamber 28 is disposed above the metering chamber 14. Vents 29 provide communication between the metering and expansion chambers 14 and 28 when the valve assembly 20 is in the load position as depicted in FIG. 1. The vents 29 are closed by the valve plate 21 when the valve assembly is in the raised or dispense position as shown in FIG. 3.

It will be appreciated that communication between the interior of the bottle 11 and the atmosphere must be necessarily provided. An opening 30 formed in a wall of the expansion chamber 28 and/or cap 12 may be provided to go some way toward meeting that end. A tube 36 connecting the upper regions of the chambers 14 and 28 is also provided in the example construction and forms part of the communication with the atmosphere.

In use, the dispenser 10 operates as follows:

When it is desired to dispense a metered quantity of liquid or other flowable material into an appliance or receptacle downstream of the dispenser 10, (and preferably directly below the discharge nozzle 16), a button or other triggering means (not shown) is actuated to cause energization of the solenoid coil 17. Energization thereof causes the core 18 to move upwardly, and to raise the valve assembly 20 into the dispense position, at which the inlet port and vents 29 are closed by the valve plate 21. (FIG. 3)

The outlet port 7 and discharge nozzle 16 are opened as the valve assembly 20 commences its upward travel, and the liquid or other flowable material contained in the metering chamber 14 is thereby allowed to be dispensed. As that dispensing commences, some of the liquid or other flowable material contained in the expansion chamber 28 may fall into the metering chamber 14 before the vents 29 are closed, but the amount will not be great and consequently the metering facility of the dispenser 10 will not be significantly disturbed. Some discharge may continue after the valve plate 21 closes the air vents 29 because of the continuing communication of between the metering and expansion chambers 14 and 28, and atmosphere via the tube 36.

It is generally preferred that the timer means (or alternative control means) is operative to maintain the solenoid coil 17 in the energized state until the entire contents of the metering chamber 14 are fully dispensed. The volume of the liquid or other flowable material to be meterably dispensed will substantially be determined by the volume of the metering chamber 14, the dimensions of the inlet and outlet passages 13 and 15 and the operating period of the solenoid.

It will thus be appreciated that the operating period of the solenoid and physical dimensions of the body 1 of the dispenser 10 may be adapted to allow only a portion of the liquid or other flowable material held within the dispenser 10 to be dispensed on each operation thereof. Preferably however, the whole available volume is dispensed each time the invention is actuated. Thus, whilst the arrangement may be such that part only of the contents are discharged in a single operation of the dispenser 10, it is preferred that the volumetric capacity of the metering chamber 14 may be varied by adding one or more displacement rings or slugs 23a to the valve assembly 20 (such as about stem 23), or by removing one or more such rings or slugs 23a.

At completion of the dispensing operation, the solenoid coil 17 is de-energized and the spring 27 functions to return the valve assembly 20 to its lowered and closed position. The inlet port 6 is thereby opened and the outlet port 7 and discharge nozzle closed. Liquid or other flowable material is then able to be discharged from the bottle 11 to reload the metering chamber 14. The vents 29 are also open so that any liquid remaining in the expansion chamber 28 may fall into the metering chamber 14.

When the liquid or other flowable material in the metering chamber 14 rises to the point where it covers and closes off the lower end of the discharge passage 13, air is unable to enter the bottle 11 by way of the vents 29 or tube 36. A partial vacuum is thereby formed within the space above the remaining contents of the bottle 11, and the movement of the liquid or other flowable material out of the bottle 11 ceases. Nevertheless, should there be any subsequent expansion of the liquid or other flowable material within the bottle 11, and/or metering chamber 14, the resulting increase in volume is permitted by communication between the metering and expansion chambers 14 and 28, via vents 29.

The volumetric size of the expansion chamber 28 may be permitted to cope with the maximum expected expansion of the contents of the bottle 11 and metering chamber 14.

ADVANTAGES OF THE PREFERRED EMBODIMENT

It will be appreciated from the foregoing description, that a dispenser 10 according to the present invention, is of a relatively simple yet effective construction. There is a minimum of moving parts so that the probability of malfunction is reduced.

The preferred construction described has ancillary advantages such as compensation for the expansion of the liquid contents or other flowable material by the provision of an expansion chamber 28, and a substantially drip free discharge nozzle 16 because of the provision of a positive closure element 33 disposed there-within. The ability to separate the main body 1 of the dispenser 10 from the bottle 11 whilst automatically closing the bottle 11, is also of advantage.

The preferred construction is much easier to clean than conventional dispensers. With this new design, the valve system can be removed and washed or flushed under a tap, simply by releasing the lock situated on the back of the unit.

Another possibility is that if extra valve units are supplied to the user, these could be left mounted on replacement bottles enabling instant replacement or substitution of dispensed liquid, without any flushing.

VARIATIONS

Although a solenoid operated dispenser 10 is usually preferred, a dispenser incorporating features as referred to above could employ a lever mechanism (preferably acting from beneath the valve 33 so as to operate when the bottom of an interior of a glass is upwardly impinged there against) or other mechanical actuator for the valve assembly 20.

Other alterations, additions, modifications and refinements may be introduced to the constructions and arrangements of parts described and illustrated, and that it will be appreciated that such changes may be made to the those embodiments without departing from the broad inventive concept thereof and from the principles taught herein.

Thus it will be understood that this invention is not limited to the particular embodiments or applications described or illustrated, and that such descriptions and illustrations are intended to cover all alterations and additions which are within the spirit and ambit of the appended claims.

I claim:

1. A metering dispenser for liquids and other flowable materials comprising an elongate inlet passage having an entry thereto and exit therefrom coupled to a main body incorporating an elongate discharge passage having an entry thereto and an exit therefrom, a metering chamber with an inlet port thereto coupled to the exit of said inlet passage and an outlet port therefrom coupled to the entry of said discharge passage, valve actuator means to operate a valve assembly disposed within the discharge passage, said valve assembly being disposed and movable within the body between two positions, these being a first and load position in which said valve assembly acts to open said inlet passage to the metering chamber whilst the discharge passage therefrom is closed, and a second and dispense position in which said valve assembly acts to close said inlet passage from the metering chamber whilst the discharge passage therefrom is opened to thus control the flow of materials through said inlet and outlet ports, and into and out of said metering chamber, said dispenser further including an expansion chamber that incorporates venting means adapted to allow communication of the inlet passage to the atmosphere when the valve assembly is in said first and load position.

2. A metering dispenser as claimed in claim 1, wherein the expansion chamber is disposed above the metering chamber, and wherein said venting means comprises one or more ports between said metering chamber and said expansion chamber capable of being closed by said valve assembly when in said second and dispense position.

3. A metering dispenser as claimed in claim 1, wherein said actuator means incorporates a corrosion resistant surface.

4. A metering dispenser as claimed in claim 3, wherein said actuator means is formed at least in part from stainless steel materials.

5. A metering dispenser as claimed in claim 1, wherein said actuator means is slidingly fitted within said discharge passage and incorporates at least one channel to facilitate the flow of materials there past.

6. A metering dispenser as claimed in claim 5, wherein said valve actuator means comprises a core movably disposed within the discharge passage and coupled to the valve assembly, and wherein a solenoid coil associated with said core is disposed around said discharge passage such that with energization of said coil the core can be induced to move the valve assembly coupled thereto.

7. A metering dispenser as claimed in claim 1, wherein said valve assembly and actuator means are disposed on a common axis such that said valve assembly moves correspondingly with the actuation means along that axis.

8. A metering dispenser as claimed in claim 1, wherein said valve assembly comprises means to sealingly abut said one or other of said inlet port to or outlet port from the metering chamber as said assembly is moved within said body.

9. A metering dispenser as claimed in claim 1, wherein said valve assembly further includes means adapted to close the exit end of the discharge passage, when said valve assembly is in the said first and load position and further acting to open said exit end of the discharge passage when the valve assembly is at the said second and dispense position.

10. A metering dispenser as claimed in claim 1, wherein said venting means also includes a vent tube passing from said metering chamber to an upper region of said expansion chamber, said vent tube being positioned in such a way as not to be closed off by the movement of the valve assembly into the said second and dispense position.

11. A metering dispenser for liquids and other flowable materials comprising an elongate inlet passage having an entry thereto and exit therefrom coupled to a main body incorporating an elongate discharge passage having an entry thereto and an exit therefrom, a metering chamber with an inlet port thereto coupled to the exit of said inlet passage and an outlet port therefrom coupled to the entry of said discharge passage, an expansion chamber connected to said metering chamber, valve actuator means to operate a valve assembly disposed within the discharge passage, said valve assembly being disposed and movable within the body and adapted to control the flow of materials through said inlet and outlet ports, and into and out of said metering chamber and wherein the inlet passage is provided within a cap separable from the main body, said cap incorporating a biased valve adapted to close the entry to the inlet passage upon separation of the cap from the body.

* * * * *